(12) United States Patent
Suda (10) Patent No.: US 6,829,414 B2
(45) Date of Patent: Dec. 7, 2004

(54) MULTI-BEAM SCANNING APPARATUS

(75) Inventor: Tadaaki Suda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/319,505

(22) Filed: Dec. 16, 2002

(65) Prior Publication Data

US 2003/0112420 A1 Jun. 19, 2003

(30) Foreign Application Priority Data

Dec. 17, 2001 (JP) .................................. P2001-382584

(51) Int. Cl.⁷ ..................... G03B 27/72; G03B 27/52
(52) U.S. Cl. ............................. 385/35; 355/40
(58) Field of Search ...................... 355/35, 40–41, 355/47, 69; 372/38.01, 29; 359/204; 347/238

(56) References Cited

U.S. PATENT DOCUMENTS

| | | | |
|---|---|---|---|
| 4,451,882 A | * | 5/1984 | Dshkhunian et al. .......... 712/32 |
| 4,788,560 A | * | 11/1988 | Miura ......................... 347/236 |
| 5,418,806 A | | 5/1995 | Araki |
| 5,892,219 A | * | 4/1999 | Minakuchi et al. .......... 250/205 |
| 5,933,266 A | | 8/1999 | Minakuchi |
| 6,414,778 B1 | * | 7/2002 | Hori ........................... 359/204 |
| 6,462,855 B1 | * | 10/2002 | Komiya et al. .............. 359/212 |
| 6,466,247 B1 | * | 10/2002 | Sugano et al. .............. 347/250 |

* cited by examiner

*Primary Examiner*—Henry Hung Nguyen
(74) *Attorney, Agent, or Firm*—Greenblum & Bernstein, P.L.C.

(57) ABSTRACT

A multi-beam scanning apparatus has a scanning unit that has a plurality of semiconductor lasers and scans laser beams emitted from the plurality of semiconductor lasers; and a controller that transmits a standard signal associated with a control of the plurality of semiconductor lasers to the scanning unit. The controller has a standard signal generator that generates and outputs a sequence of pulse signals as the standard signal. The scanning unit has a plurality of laser drivers, a standard voltage generator, and a standard voltage setter. The standard voltage setter detects each of a plurality of common pulse signal sections of the standard signal in accordance with its signal-wave characteristic, and transmits each value of the plurality of standard voltage sections to a corresponding laser driver in accordance with a detected common pulse signal section.

9 Claims, 8 Drawing Sheets

MULTI-BEAM SCANNING APPARATUS

BACKGROUND OF THE INVENTION

1. Field of the Invention

The present invention relates to a multi-beam scanning apparatus that scans multiple-beams emitted from a plurality of light sources, such as semiconductor lasers. More precisely, the present invention relates to a separate control device for the plurality of light sources.

2. Description of the Related Art

In recent electronic photograph systems or printers, multi-beam scanning devices with a plurality of semiconductor lasers have been incorporated to form color-images. The number of lasers corresponds to the number of colors used for forming the color-image. For example, when Black, Cyan, Magenta, and yellow are used to form the image, four semiconductor lasers are required. To improve the process-speed of the system, generally, the plurality of semiconductor lasers is controlled simultaneously. Namely, the multiple-beams are simultaneously scanned. The scanning apparatus is composed of a scanning unit that has a plurality of semiconductor lasers and an optical system, and a controller that transmits image data to the scanning unit and controls the scanning unit. Generally, the scanning unit and the controller are separately constructed.

To obtain high-quality images with proper density, bias control and APC (Auto Power Control) are performed. The bias control is performed for improving modulation characteristics of a high-speed drive of a semiconductor laser, and the APC is performed for automatically controlling light-intensity of a semiconductor laser. The above controls must be performed separately for each of the plurality of semiconductor lasers, accordingly, an original driving circuit is provided for each semiconductor laser. For example, when 4 colors are used, four semiconductor lasers and four driving circuits are incorporated in the scanning unit, and the bias control and the APC control is performed in each driving circuit.

However, as described above, since the scanning unit and the controller are separately constructed, many signal lines are required between the scanning unit and the controller in accordance with the number of lasers. This causes complex circuit construction. Further, when using the plurality of signal lines, since image data signals and control signals influence each other, the bias control and the APC cannot be performed properly.

SUMMARY OF THE INVENTION

Therefore, an object of the present invention is to provide a multi-beam scanning apparatus that properly controls a plurality of light sources while using a single control signal line.

A multi-beam scanning apparatus according to the present invention has a scanning unit that has a plurality of semiconductor lasers and scans laser beams emitted from the plurality of semiconductor lasers; and a controller that transmits a standard signal associated with the control of the plurality of semiconductor lasers to the scanning unit. The controller has a standard signal generator that generates and outputs a sequence of pulse signals as the standard signal. The sequence of pulse signals has a plurality of common pulse signal sections that correspond to the plurality of semiconductor lasers. Each of the plurality of common pulse signal sections has a peculiar waveform characteristic depending upon the corresponding semiconductor laser. For example, each of the pulse signal sections has a peculiar duty ratio or frequency.

On the other hand, the scanning unit has a plurality of laser drivers, a standard voltage generator, and a standard voltage setter. The plurality of laser drivers drives a corresponding semiconductor laser among the plurality of semiconductor lasers in accordance with the standard signal. The standard voltage generator converts the sequence of pulse signals to a sequence of standard voltage signals that correspond to the plurality of semiconductor lasers and have a plurality of standard voltage sections. The standard voltage setter detects each of the plurality of common pulse signal sections in accordance with its signal wave characteristic, such as a frequency or a waveform, and that transmits each value of the plurality of standard voltage sections to a corresponding laser driver in accordance with the detected common pulse signal section. Each of the plurality of laser drivers controls the corresponding semiconductor laser in accordance with a value of a corresponding standard voltage section.

A multi-beam scanning apparatus according to another aspects of the present invention has a plurality of light sources, a plurality of driving circuits, an exposure unit, a controller, and a control value setter. The plurality of light sources respectively emit beam. The plurality of driving circuits corresponds to the plurality of light sources. Each driving circuit drives a corresponding light source. The exposure unit has an optical system and scans laser-beams emitted from the plurality of light sources. The controller generates a sequence of pulse signals corresponding to the plurality of light sources, the sequence of pulse signals being output via single control signal line. The control value setter sets a control value for each of the plurality of driving circuits in accordance with the sequence of pulse signals The plurality of driving circuits respectively drives the corresponding light source in accordance with the corresponding control value.

The multi-beam scanning apparatus according to another aspects of the present invention has a scanning unit, and a controller. The scanning unit has a plurality of semiconductor lasers and drives the plurality of semiconductor lasers separately. The controller generates a sequence of control signals and transmits the sequence of control signals to the scanning unit, the scanning unit being connected to the controller via a single control signal line for transmitting the sequence of control signals. The scanning unit detects a plurality of control values corresponding to the plurality of semiconductor lasers from the sequence of control signals, and drives each of the plurality of semiconductor lasers in accordance wish a corresponding control value.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Figure 1:
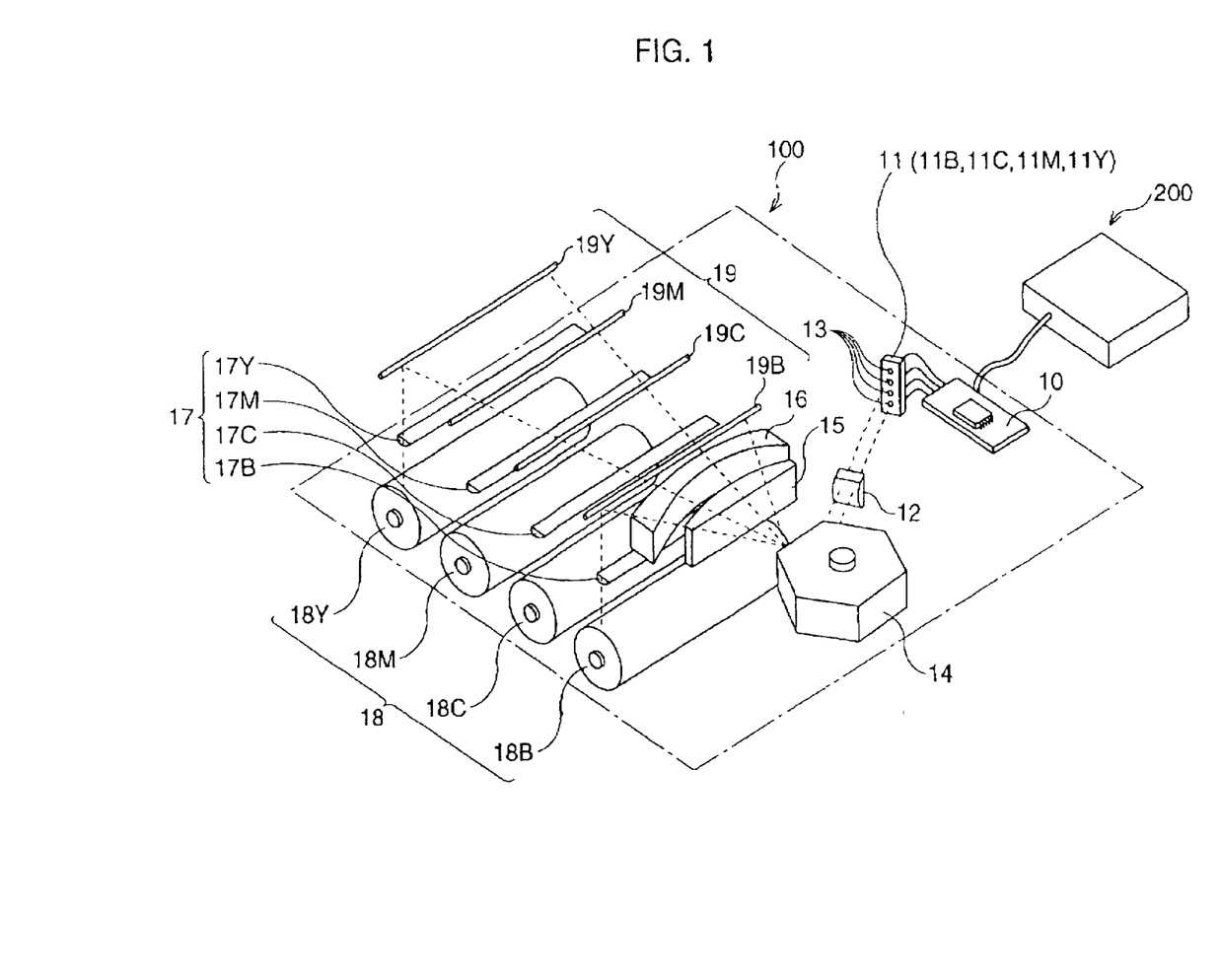
FIG. 1 is a schematic perspective view of a multi-beam scanning apparatus according to the first embodiment.

Hereinafter, the preferred embodiment of the present invention is described with reference to the attached drawings, FIG. 1 is schematic perspective view of a multi-beam scanning apparatus according to a first embodiment. The multi-beam scanning apparatus, including a scanning unit 100 and a controller 200, perform a scanning operation by using a tandem driving method. This apparatus is incorporated in an electronic photographing system that forms, or prints a color-image using four colors, Black (B), Cyan (C), Magenta (M), and Yellow (Y). The scanning unit 100 and the controller 200 are separately constructed as shown in FIG. 1.

The scanning unit 100 has a signal circuit 10, a light source 11, a cylindrical lens 12, a polygon mirror 14, a first f-θ lens 15, a second f-θ lens 16, a third f-θ lens 17, a photosensitive drum 18, and a reflecting mirror 19. The light source 11 has four semiconductor lasers, a first semiconductor laser 11B, a second semiconductor laser 11C, a third semiconductor laser 11M, and a fourth semiconductor laser 11Y, which respectively correspond to the colors B, C, M, and Y. The light source 11 has four collimator lenses 13, which correspond to the four semiconductor lasers 11B, 11C, 11M, and 11Y respectively. The third f-θ lens 17 is composed of a f-θ lens 17B for the first semiconductor laser 11B, a f-θ lens 17C for the second semiconductor laser 11C, a f-θ lens 17M for the third semiconductor laser 11M, and a f-θ lens 17Y for the fourth semiconductor laser 11Y. The photosensitive drum 18 is composed of a first drum 18B corresponding to the first semiconductor laser 11B, a second drum 18C corresponding to the second semiconductor laser 11C, a third drum 18M corresponding to the third semiconductor laser 11M, and a fourth drum 18Y corresponding to the fourth semiconductor laser 11Y. The reflecting mirror 19 is composed of a first mirror 19B corresponding to the first semiconductor laser 11B, a second mirror 19C corresponding to the second semiconductor laser 11C, a third mirror 19M corresponding to the third semiconductor laser 11M, and a fourth mirror 19Y corresponding to the fourth semiconductor laser 11Y.

Four parallel laser beams, emitted from the light source 11, pass through the cylindrical lens 12. Each laser beam passing through the cylindrical lens 12 is reflected on the polygon mirror 14 and is deflected toward the photosensitive drum 18. The laser beam, which is emitted from the first semiconductor laser 11B, is reflected on the first mirror 19B, then passes through the f-θ lens 17B, and reaches the first drum 18B. Similarly, the laser beam, which is emitted from the second semiconductor laser 11C, is reflected on the second mirror 19C, then passes through the f-θ lens 17C, and reaches the second drum 18C. The laser beam, which is emitted from the third semiconductor laser 11M, is reflected on the third mirror 19M, then passes through the f-θ lens 17M, and reaches the third drum 18M. The laser beam, which is emitted from the fourth semiconductor laser 11Y, is reflected on the fourth mirror 19Y, passes through the f-θ lens 17Y, and reaches the fourth drum 18Y. Each of the first, second, third, and fourth drums 18B, 18C, 18M, and 18Y rotates by a predetermined rotation amount so that the exposure of the photosensitive drum 18 is performed. The rotation of the polygon mirror 14 is controlled in accordance with the light detected by a monitoring photodiode (herein not shown) so that the scanning of the multiple beams is synchronized.

Figure 2:
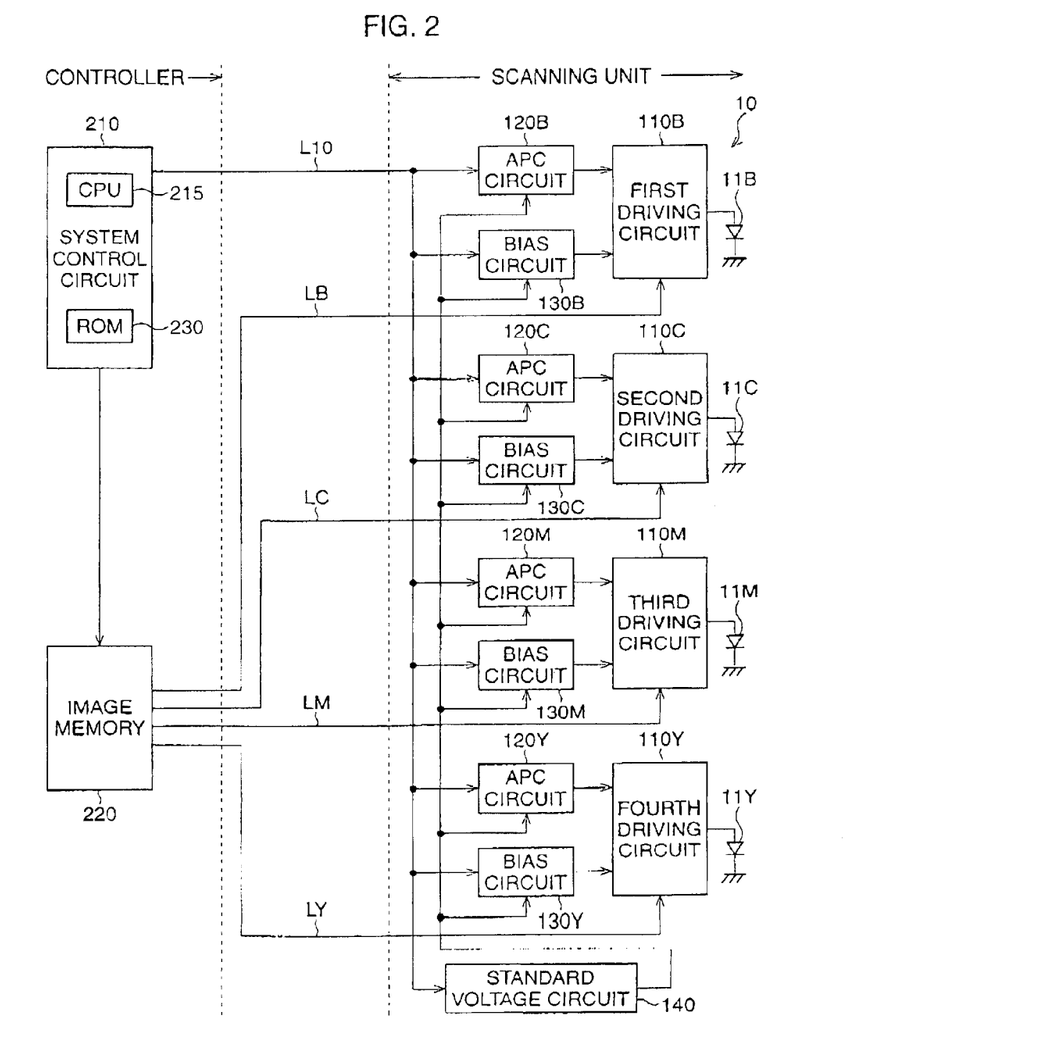
FIG. 2 is a block diagram of the scanning unit and the controller.

FIG. 2 is a block diagram of the scanning unit 100 and the controller 200. The controller 200 has a system control circuit 210 with a CPU (Central Processing Unit) 215, a ROM (Read Only Memory) 230 and an image memory 220. Scanning control data, associated with a bias control and an APC (Auto-Power Control) of the light source 11, is stored in the ROM 230. As described later, a series of pulse signals, the frequency and duty ratio of which varies periodically, is output from the System control circuit 210 to the scanning unit 100. Further, image data, corresponding to the black, cyan, magenta, and yellow colors, are output from the image data in accordance with synchronizing signals fed from the system control circuit 210. The image data corresponds to image density of the black, cyan, magenta, and yellow colors represented in the color-image, and corresponds to the light intensity of the first, second, third, and fourth semiconductor lasers 11B, 11C, 11M, and 11Y. Four semiconductor lasers 11B, 11C, 11M, and 11Y are respectively controlled in accordance with the image data. Namely, the image memory 220 outputs signals for driving the four semiconductor lasers 11B, 11C, 11M, and 11Y to the scanning unit 100.

The signal circuit 10 in the scanning unit 100 has first, second, third, and fourth driving circuits 110B, 110C, 110M, and 110Y, which respectively drive the first, second, third, and the fourth semiconductor lasers 11B, 11C, 11M, and 11Y. The image memory 220 in the controller 200 is connected to the first, second, third, and fourth driving circuits 110B, 110C, 110M, and 110Y via their respective image signal lines LB, LC, LM, and LY. Further, the signal circuit 10 has four APC circuits 120B, 120C, 120M, and 120Y; four bias circuits 130B, 130C, 130M, and 130Y; and a standard voltage circuit 140. The four APC circuits 120B, 120C, 120M, and 120Y, and the four bias circuits 130B, 130C, 130M, and 130Y are respectively connected to the first, second, third, and fourth driving circuits 110B, 110C, 110M, and 110Y. Then, the four APC circuits 120B, 120C, 120M, 120Y, the tour bias circuits 130B, 130C, 130M, 130Y; and the standard voltage circuit 140 are connected with the system control circuit 210 in the controller 200 via a control signal line L10. Each of the four APC circuits 120B, 120C, 120M, and 120Y transmits an APC standard voltage "$V_{APC}$" to a corresponding driving circuit among the four driving circuits 110B, 110C, 110M, and 110Y, while each of the four bias circuits 130B, 130C, 130M, and 130Y transmits a bias standard voltage "$V_b$" to a corresponding driving circuit.

The standard voltage circuit 140 is connected to the four APC circuits 120B, 120C, 120M, and 120Y, and the four bias circuits 130B, 130C, 130M, and 130Y. The standard voltage circuit 140 includes a DC converter that generates a sequence of standard voltage signals on the basis of a sequence of pulse signals, which are fed from the system control circuit 210 as the standard signal. The sequence of standard voltage signals is generated by integrating, averaging, and smoothing the sequence of pulse signals. The sequence of standard voltage signals corresponds to DC (Direct Current) signals.

Figure 3:
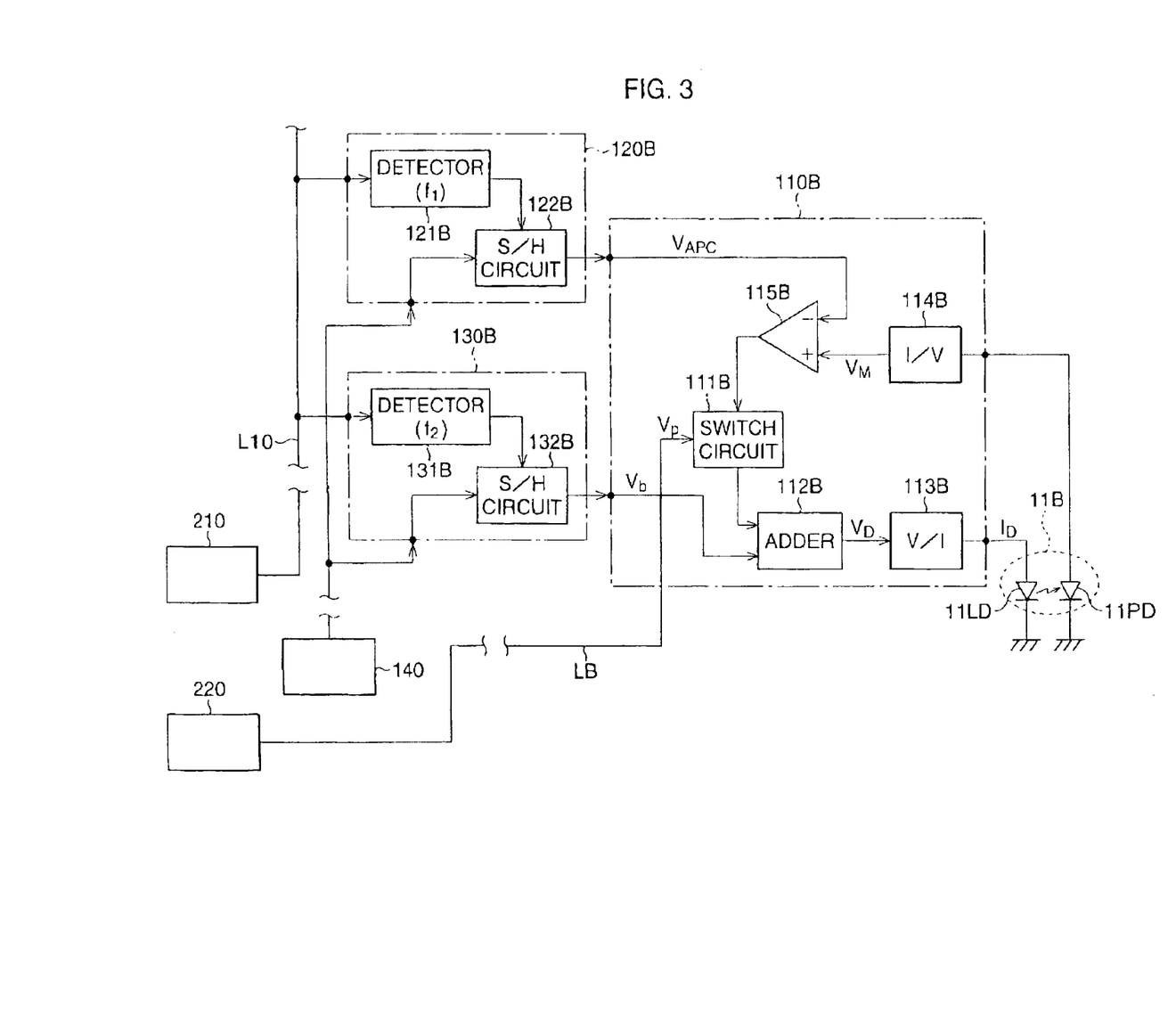
FIG. 3 is a block diagram of the first driving circuit, the APC circuit, and the bias circuit.

FIG. 3 is a block diagram of the first driving circuit 110B, the APC circuit 120B, and the bias circuit 130B.

The driving circuit 110B has a switch circuit 111B, an adder 112B, a V/I converter 113B, an I/V converter 114B, and a comparator 115B. The image data corresponding to the semiconductor laser 11B, which is fed from the image memory 220 in the controller 200 via the image line LB, is input to the switch circuit 111B, and the switch circuit 111B is selectively tuned ON/OFF in accordance with the image data. Consequently, the image data is selectively fed to the adder 112B as driving voltage signals to perform an exposure corresponding to the color image to be formed. The bias voltage signal is added to the driving voltage signals in the adder 112B, and the driving voltage "$V_D$" output from the adder 112B is fed to the V/I converter 113B, wherein the driving voltage "$V_D$" is transformed to the driving current "$I_D$". The driving current "$I_D$" is fed to a laser diode 11LD in the semiconductor laser 11B, which emits light with an intensity corresponding to the values of driving current "$I_D$", namely, corresponding to the image data.

A photo-diode 11PD in the semiconductor laser 11B detects the light emitted from the laser diode 11LD, and outputs a current to the I/V converter 114B in accordance with the light-intensity. The current is transformed to the voltage in the I/V converter 114B, thus the intensity of the emitted light is detected as a monitoring voltage "$V_M$". The monitoring voltage "$V_M$" is fed to the comparator 115B, wherein the monitoring voltage "$V_M$" is compared to the APC standard voltage "$V_{APC}$". Then, the driving voltage "$V_D$" is adjusted in accordance with the difference between the monitoring voltage "$V_M$" and the APC standard voltage "$V_{APC}$".

The APC circuit 120B has a detector 121B that detects a specific frequency "$f_1$" from the series of pulse signals fed from the controller 200, and a sample-hold (S/H) circuit 122B that samples and holds a corresponding APC standard voltage "$V_{APC}$" from the sequence of standard voltage signals, which is fed from the standard voltage circuit 140. The detector 121B outputs a detecting signal when detecting the frequency "$f_1$", while the S/H circuit 122B samples the standard voltage on the basis of the detecting signal fed from the detector 121B and holds the APC standard voltage "$V_{APC}$" until a next detecting signal is fed from the detector 121B. The held APC standard voltage "$V_{APC}$" is fed to the comparator 115B. On the other hand, the bias circuit 130B has a detector 131B that detects a specific frequency "$f_2$", different from the frequency f1, from the series of pulse signals, and a sample-hold (S/H) circuit 132B that samples and holds the bias standard voltage in accordance with a detecting signal fed from the detector 131B. The bias standard voltage "$V_b$" is fed to the adder 112B.

The construction of the second driving circuit 110C, the third driving circuit 110M, and the fourth driving circuit 110Y are the same as that of the first driving circuit 110B. Further, similarly to the APC circuit 120B, each of the AFC circuits 120C, 120M, and 120Y shown in FIG. 2 has a detector and a S/H circuit, and each of the bias circuits 130C, 130M, 130Y has a detector and a S/H circuit. Note, the APC circuit 120C detects a frequency "$f_3$" from the sequence of pulse signals and the bias circuit 130C detects a frequency "$f_4$". Similarly, the APC circuit 120M and the bias circuit 130M detect frequencies "$f_5$" and "$f_6$" respectively, and the APC circuit 120Y and the bias circuit 130Y detect frequencies "$f_7$" and "$f_8$" respectively.

In this way, the driving current "$I_D$" is fed to the laser diode 11LD in accordance with the image data, so that the laser diode 11LD emits light with the light-intensity corresponding to the image density of the image data. Further, a standard voltage associated with an ON/OFF control of the laser diode 11LD is set as the bias standard voltage "$V_b$". As is well known in the prior art, the bias standard voltage "$V_b$" is set for driving the laser diode 11LD within a proper range suitable for the driving current and the light-emission power characteristics. The value of the bias standard voltage "$V_b$" is defined in accordance with the threshold characteristics. Thus, the modulation characteristics in the laser diode 11LD are modified when high-frequency diving current flows. Then, the driving current "$I_D$" is automatically adjusted in accordance with the APC standard voltage "$V_{APC}$", so that the light-intensity is stabilized. Each of the semiconductor lasers 11B, 11C, 11M, and 11Y has peculiar characteristics and the degradation progress is also different for each semiconductor laser. Accordingly, the bias control and the APC (Auto Power Control) are separately performed for the four semiconductor lasers 11B, 11C, 11M, and 11Y. Namely, the bias standard voltage "$V_b$" and the APC standard voltage "$V_{APC}$" are defined for each of the semiconductor lasers 11B, 11C, 11M, and 11Y.

Figure 4:
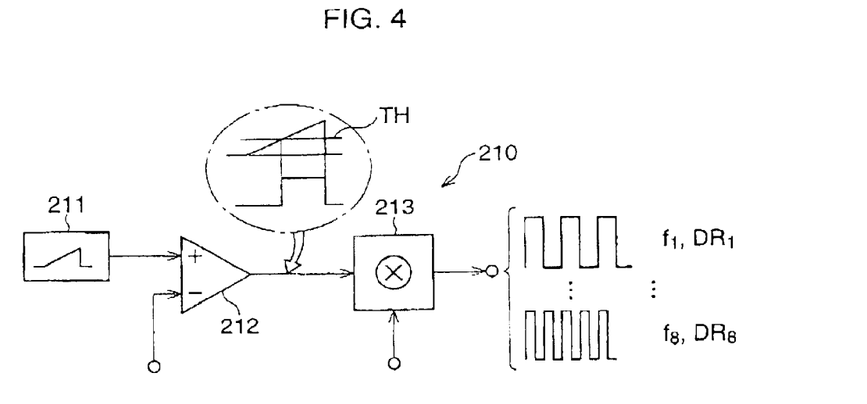
FIG. 4 is a block diagram of the system control circuit.

FIG. 4 is a block diagram of the system control circuit 210. Hereinafter, the generation of the sequence of pulse signals is explained.

The system control circuit 210 has a saw-tooth waveform generator 211, a comparator 212, and a frequency converter 213. The saw-tooth waveform generator 211 generates a sequence of saw-tooth waveform signals, which have a standard frequency "$f_0$". The saw-tooth waveform pulse signals are fed to the comparator 212. The comparator 212 transforms the sequence of saw-tooth waveform signals to a sequence of rectangular waveform signals, which has eight groups of common rectangular signal ranges, and outputs the a sequence of rectangular waveform signals to the frequency converter 213. Each of the eight groups of common rectangular signal ranges has different duty ratio value. As shown in FIG. 4, the sequence of saw-tooth waveform signals is converted to the sequence of rectangular waveform signals in accordance with a threshold "TH" corresponding to the duty ratio. In this embodiment, eight values of the duty ratios "$DR_1$ to $DR_8$" are prepared for the four APC circuits 120B, 120C, 120M, and 120Y and the four bias circuit 130B, 130C, 130M, and 130Y. The duty ratios "$DR_1$ to $DR_8$" are input to the comparator 212 in order.

The frequency converter 213 transforms the frequency "$f_0$" of the series of rectangular waveform signals to a sequence of rectangular waveform signals with eight frequencies "$f_1$ to $f_8$". The frequency varies with the eight duty ratios "$DR_1$ to $DR_8$". Consequently, sequences of the rectangular waveform signals are output to the scanning unit 100 as a sequence of pulse signals. The sequence of rectangular waveform signals varies periodically in accordance with the frequencies "$f_1$ to $f_8$", namely, the duty ratios "$RD_1$ to $RD_8$".

Figure 5:
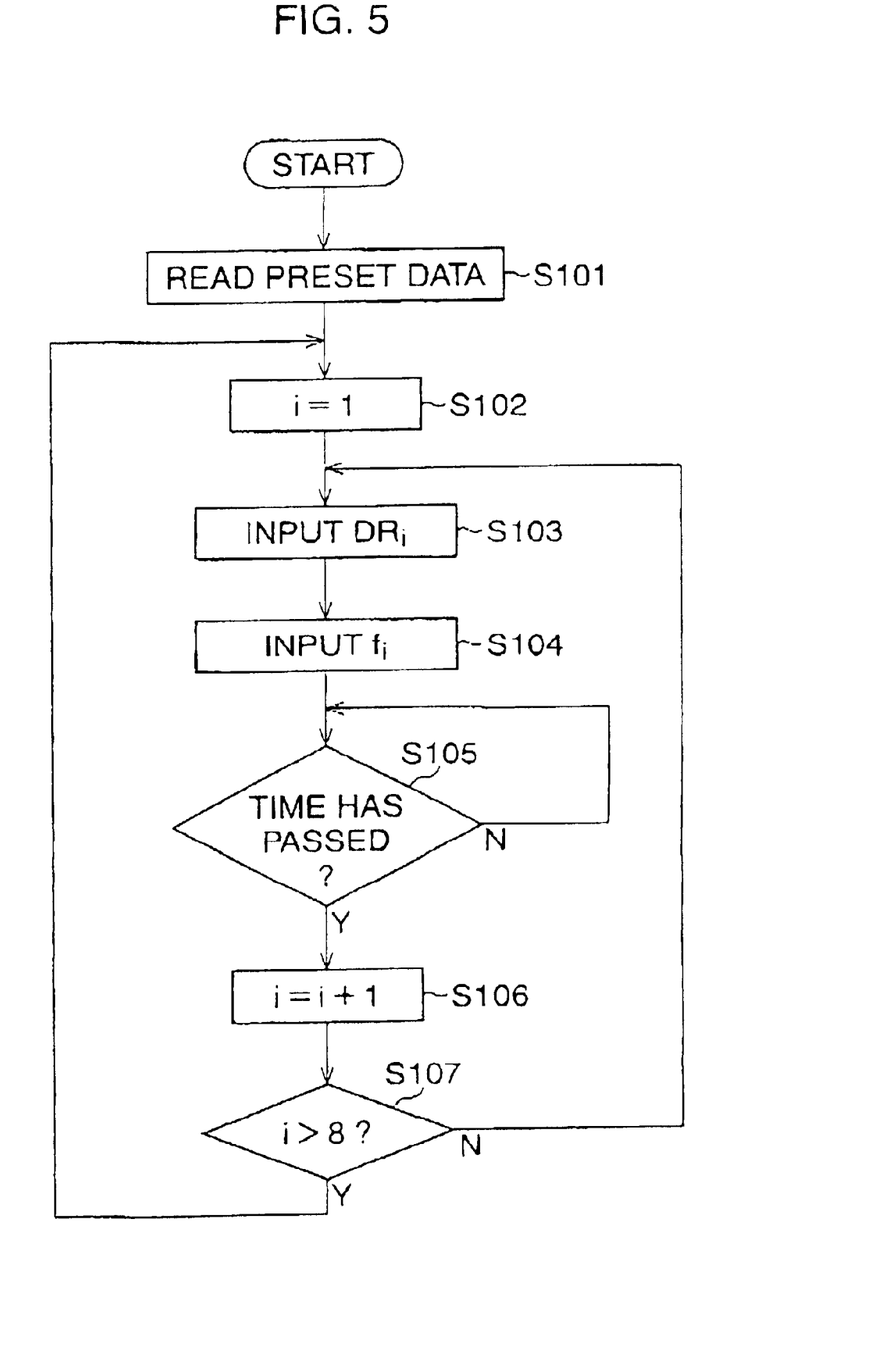
FIG. 5 is a view showing a flowchart of a standard signal generating process, which is performed by the system control circuit.
Figure 6A:
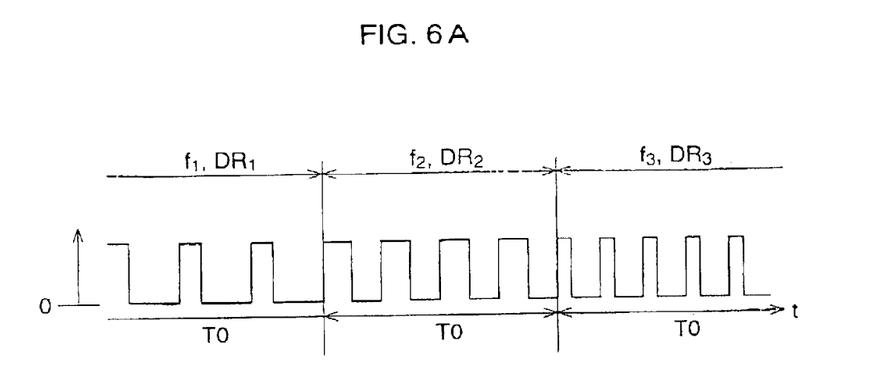
FIGS. 6A and 6B are a view showing the sequence of rectangular waveform signals and a view showing the standard voltage.
Figure 6B:
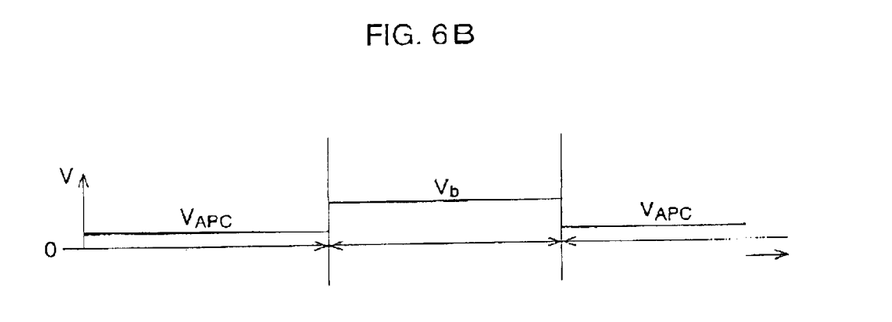

FIG. 5 is a view showing a flowchart of a standard signal generating process, which is performed by the system control circuit 210. FIG. 6A is a view showing the sequence of rectangular waveform signals. FIG. 6B is a view showing the standard voltage.

In Step S101, the duty ratio data associated with the eight values of the duty ratios "$DR_1$ to $DR_8$" is read from the ROM 230. The duty ratios "DR1", "$DR_3$", "$DR_5$", and "$DR_7$" are prepared for the APC standard voltage "$V_{APC}$", while the duty ratios "$DR_2$", "$DR_4$", "$DR_6$", and "$DR_8$" are prepared for the bias standard voltage "$V_b$". In Step S102, a variable "i" (i=1 to 8) is set to "1". After Step S102 is performed, the process goes to Step S103.

In Step S103, a signal of the duty ratio $DR_i$ is input to the comparator 212 so that a series of rectangular waveform signals with the duty ratio $DR_i$ is output to the frequency converter 213. In Step S104, a signal with the frequency $f_i$ is input to the frequency converter 213 so that the frequency "$f_0$" of the rectangular waveform signals with the duty ratio "$DR_i$" is changed to "$f_i$" and the waveform is changed. After Step S104 is performed, the process goes to Step S105.

In Step S105, it is determined whether a predetermined time period "T0" has passed or not. The time period "T0" indicates a time period that is necessary to form the common rectangular signal ranges with the duty ratio "$DR_i$" and the frequency "$f_i$". When it is determined that the predetermined time period "T0" has passed, the process goes to Step S106, wherein the variable "i" is incremented by 1. After Step S106 is performed, the process goes to Step S107. On the other hand, when it is determined that the predetermined time period "T0" has not passed, Step S105 is repeatedly performed.

In Step S107, it is determined whether the variable "i" is more than "8". When it is determined that the variable "i" is not more than "8", the process returns to Step S103 and Steps S103 to S106 are repeatedly performed. On the other hand, when it is determined that the variable is more than "8", the process returns to Step S102, and Steps S102 to S107 are repeatedly performed. Thus, as shown in FIG. 6A, a sequence of rectangular waveform signals having eight groups of common rectangular signal ranges, each of which has a specific frequency $f_i$ and a duty ratio $DR_i$, is generated and periodically output from the system control circuit 210.

When the sequences of rectangular waveform signals are transmitted to the standard voltage circuit 140 via the control line L10, as described above, the sequences of standard voltage signals are generated and transmitted to the four APC circuit 120B, 120C, 120M, and 120Y, and the four bias circuit 130B, 130C, 30M, and 130Y. The standard voltage circuit 140 generates the APC standard voltage "$V_{APC}$" or the bias standard voltage "$V_b$", which maintains a constant voltage value, by averaging values of signals in a range corresponding to the time "T0", namely, in a range having one type common waveform. The value of the standard voltage "$V_{APC}$" or "$V_b$" depends upon the duty ratio "$DR_i$". As the duty ratio "$DR_i$" gets higher, the standard voltage gets higher. The standard voltage signals "$V_{APC}$" or "$V_b$" are obtained in order on the basis of the sequence of rectangular waveform signals, so that the sequence of standard voltage signals shown in FIG. 6B is obtained and output.

The detector 121B in the APC circuit 120B (See FIG. 3), corresponding to the first driving circuit 110B, detects a rectangular waveform signal portion with the duty ratio $DR_1$ and the frequency $f_1$ from the sequence of complex rectangular waveform signals (See FIG. 6A), and outputs the detecting signal to the S/H circuit 122B in the APC circuit 120B (See FIG. 3). The S/H circuit 122B samples and holds the standard voltage signals, the value of which corresponds to the duty ratio $DR_1$, from the sequence of standard voltage signals (See FIG. 6B). The S/H circuit 122B outputs the standard voltage as the APC standard voltage "$V_{APC}$".

Further, the detector 131B in the bias circuit 130B, which corresponds to the first driving circuit 110B, detects a rectangular waveform signal portion with the duty ratio "$DR_2$" and the frequency "$f_2$" from the sequence of rectangular waveform signals, and outputs a detecting signal to the S/H circuit 132B. The S/H circuit 132B samples and holds the standard voltage signals corresponding to the duty ratio "$DR_2$", and outputs the standard voltage as the bias standard voltage "$V_b$".

Similarly, the APC circuit 120C detects a rectangular waveform signal portion with the frequency "$f_3$" and the duty ratio "$DR_3$" and outputs the corresponding standard voltage signal as the APC standard voltage "$V_{APC}$", while the bias circuit 130C detects a rectangular waveform signal portion with the frequency "$f_4$" and the duty ratio "$DR_4$" and outputs the corresponding standard voltage as the bias standard voltage "$V_b$". The APC circuit 120M detects a rectangular waveform signal portion with the frequency "$f_5$" and the duty ratio "$DR_5$" and outputs the corresponding standard voltage as the APC standard voltage "$V_{APC}$", while the bias circuit 130M detects a rectangular waveform signal portion with the frequency "$f_6$" and the duty ratio "$DR_6$" and outputs the corresponding standard voltage as the bias standard voltage "$V_b$". The APC circuit 120Y detects a rectangular waveform signal portion with the frequency "$f_7$" and the duty ratio "$DR_7$" and outputs the corresponding standard voltage as the APC standard voltage "$V_{APC}$", while the bias circuit 130Y detects a rectangular waveform signal portion with the frequency "$f_8$" and the duty ratio "$DR_8$" and outputs the corresponding standard voltage as the bias standard voltage "$V_b$".

In this way, in this embodiment, the scanning unit 100 is connected to the controller 200 via the four image signal lines LB, LC, LM, and LY and the single control signal line L10. The sequences of rectangular waveform signals are transmitted from the controller 200 to the scanning unit 100 via the control signal line L10. The standard voltage circuit 140 outputs the sequence of standard voltage signals on the basis of the sequence of rectangular waveform signals. The APC circuit 1203, 120C, 120M, and 120Y respectively detect a corresponding series of rectangular waveform pulse signal ranges from the sequence of rectangular waveform signals by the corresponding frequency of the sequence of rectangular waveform signals. Then, the APC circuit 120B, 120C, 120M, or 120Y transmits the corresponding APC standard voltage "$V_{APC}$" to the driving circuit 110B, 110C, 110M, or 110Y by the sample-hold process. Similarly, the bias circuit 130B, 130C, 130M, and 130Y respectively detect the corresponding series of rectangular waveform signal ranges by the corresponding frequency of the sequence of rectangular waveform signals, and transmit the corresponding bias standard voltage "$V_b$" from the bias circuit 130B, 130C, 130M, or 130Y to the driving circuit 110B, 110C, 100M, or 110Y.

Thus, the bias standard voltage "$V_b$" is set in each driving circuit by using only the single control signal line L10 so that the modulation characteristics during the high-speed performance of each of the semiconductor lasers 11B, 11C, 11M, 11Y, are improved. On the other hand, the APC standard voltage "$V_{APC}$" is also set in each driving circuit by using only the single control signal line L10 so that the light-intensity of each of the semiconductors lasers 11B, 11C, 11M, and 11Y is controlled. Since the control signal is transmitted from the controller 200 to the scanning unit 100, the timing error with respect to the signal transmission does not occur due to a plurality of control signal lines.

Figure 7:
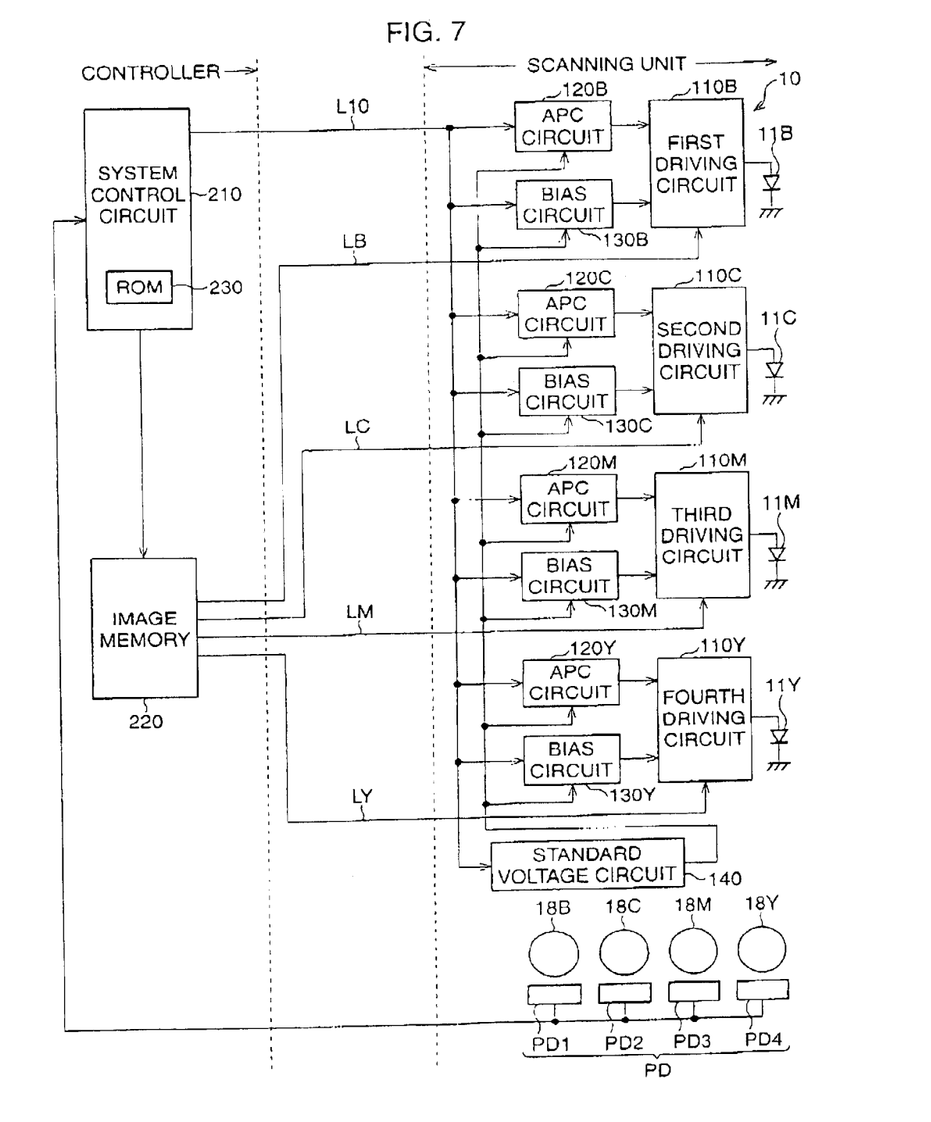
FIG. 7 is a block diagram of a scanning unit and a controller according to the second embodiment.
Figure 8:
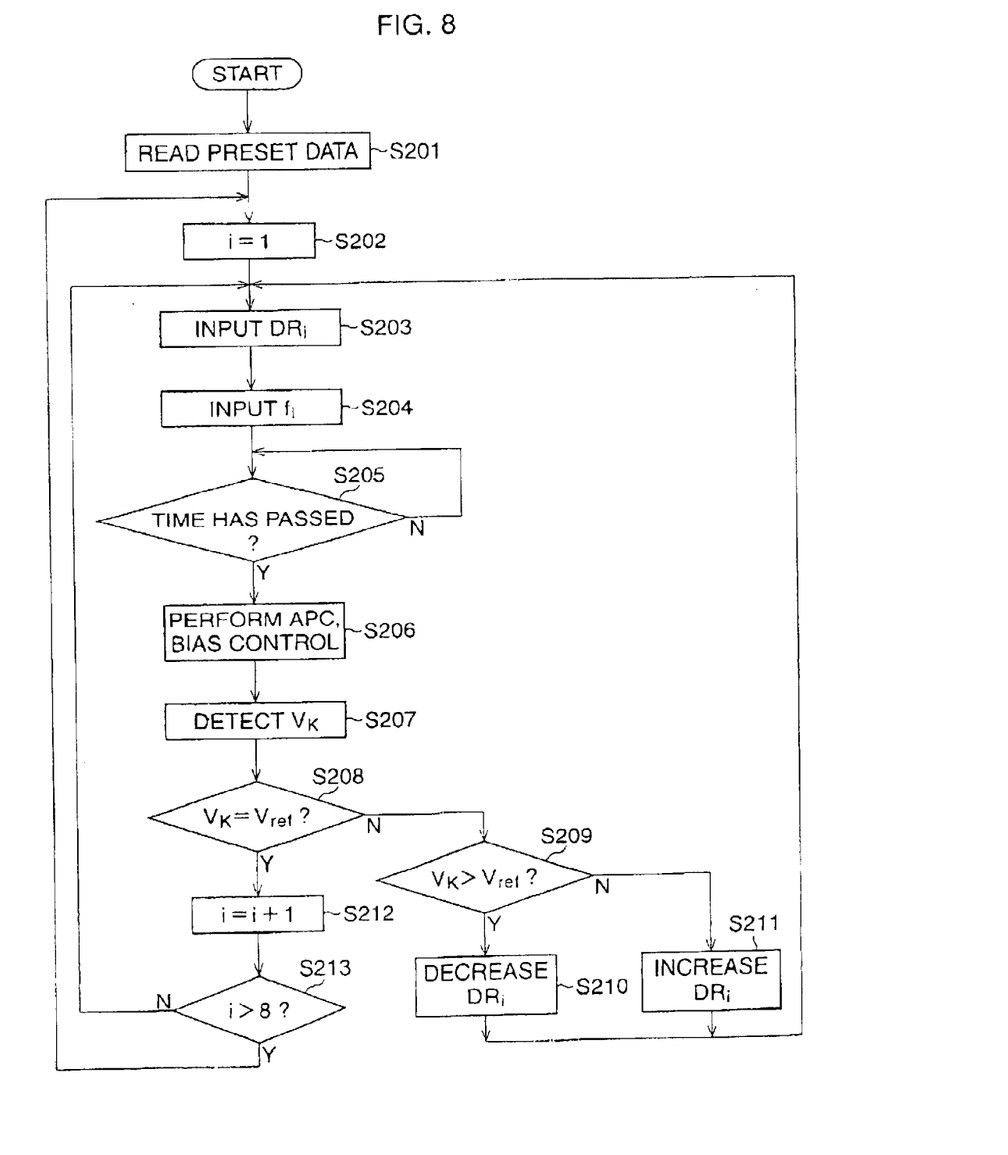
FIG. 8 is a view showing a flowchart of a standard signal generating process according to the second embodiment.

With reference to FIGS. 7 and 8, the second embodiment is explained. The second embodiment is different from the first embodiment in that the APC and the bias control are performed while detecting the multiple-beams directed to the photosensitive drum.

FIG. 7 is a block diagram of a scanning unit and a controller according to the second embodiment. A surface electric potential detector PD is provided in the scanning unit 100 and is composed of a first, second, third, and fourth Senor PD1, PD2, PD3, and PD4. The first, second, third, and fourth sensors PD1, PD2, PD3, and PD4 respectively detect a surface electric potential of the first, second, third, and fourth photosensitive drums 18B, 18C, 18M, and 18Y. The detected electric potentials are fed to the system control circuit 210.

FIG. 8 is a view showing a flowchart of a standard signal generating process according to the second embodiment.

Steps S201 to S205 are performed in the same way as Steps S101 to S105 shown in FIG. 5. Namely, the preset data associated with the APC standard voltage "$V_{APC}$" and the bias standard voltage "$V_b$" is read from the image memory 230 and then the variable "i" is set to 1. Then, the duty ratio "$DR_i$" is input to the comparator 212 and the frequency "$f_i$" is input to the frequency converter 213. When the predetermined time T0 has passed, the process goes to Step S206. In Step S206, the standard signal is output to the scanning unit 100 to perform the bias control and the APC in the corresponding semiconductor laser. After step S206 is performed, the process goes to Step S207.

In Step S207, the surface electric potential "$V_k$" is detected on the surface of the corresponding drum by the corresponding sensor. In Step S208, it is determined whether the detected surface electric potential "$V_k$" is substantially same as a reference electric potential "$V_{ref}$". The reference electric potential "$V_{ref}$" indicates tho proper surface electric potential, which leads to a high quality printed image.

When it is determined that the detected surface electric potential "$V_k$" is not substantially the same as the reference electric potential "$V_{ref}$" in Step S208, the process goes to Step S209. In Step S209, it is determined whether the detected surface electric potential "$V_k$" is more than the reference electric potential "$V_{ref}$". When it is determined that the detected surface electric potential "$V_k$" is more than the reference electric potential "$V_{ref}$", the process goes to Step S210, wherein the duty ratio "$DR_i$" is decreased by a predetermined value. On the other hand, when it is determined that the detected surface electric potential "$V_k$" is not more than the reference electric potential "$V_{ref}$", the process goes to Step S211, wherein the duty ratio "$DR_i$" is increased by a predetermined value. After Step S210 or Step S211 is performed, the process returns to Step S203. Step S210 or S211 is performed repeatedly until the detected surface electric potential "$V_k$" is substantially the same as the reference electric potential "$V_k$".

On the other hand, when it is determined that the detected surface electric potential "$V_k$" is substantially the same as the reference electric potential "$V_{ref}$" in Step S208, the process goes to Step S212. Steps S212 and S213 are performed in the same way as Steps S106 and S107 shown in FIG. 5.

In this embodiment, the tandem method using a plurality of photosensitive drums is applied, however, a multi-beam scanning apparatus using a single photosensitive drum may be applied. Other light source, such as an LED (Light Emitting Diode) may be used in place of the semiconductor laser.

The controller 200 may generate a sequence of pulse signals, which has another waveform characteristic in place of the duty ratio and the frequency. In the scanning unit 100, the standard voltage "$V_{APC}$" or "$V_b$" may be detected in accordance with the waveform characteristic.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2001-382584 (filed on Dec. 17, 2001) which is expressly incorporated herein, by reference, in its entirety.

What is claimed is:

1. A multi-beam scanning apparatus, comprising:
    a scanning unit that has a plurality of semiconductor lasers and scans laser beam emitted from said plurality of semiconductor lasers; and
    a controller that transmits a standard signal associated with a control of said plurality of semiconductor lasers to said scanning unit,
    wherein said controller comprises a standard signal generator that generates and outputs a sequence of pulse signals as the standard signal, the sequence of pulse signals having a plurality of common pulse signal sections that correspond to said plurality of semiconductor lasers, each of said plurality of common pulse signal sections having a peculiar waveform characteristic depending upon a corresponding semiconductor laser,
    wherein said scanning unit comprises:
    a plurality of laser drivers that respectively drive a corresponding semiconductor laser among said plurality of semiconductor lasers in accordance with the standard signal;
    a standard voltage generator that converts the sequence of pulse signals to a sequence of standard voltage signals that correspond to said plurality of semiconductor lasers and have a plurality of standard voltage ranges; and
    a standard voltage setter that detects each of the plurality of common pulse signal sections in accordance with the waveform characteristic, and transmits each value of the plurality of standard voltage ranges to a corresponding laser driver in accordance with a detected common pulse signal section, each of said plurality of laser drivers controlling the corresponding semiconductor laser in accordance with a value of a corresponding standard voltage range.

2. The multi-beam scanning apparatus of claim 1, wherein the standard signal generator generates the sequence of pulse signals such that a frequency of each of the plurality of common pulse signal sections is different, and
    wherein said standard voltage setter detects each of the plurality of common pulse signal sections in accordance with a difference of the frequency.

3. The multi-beam scanning apparatus of claim 1, wherein each of the plurality of common pulse signal sections has a duty ratio corresponding to a standard voltage for controlling a corresponding semiconductor laser, and
    wherein said standard voltage generator outputs each of the plurality of standard voltage sections by averaging each of the plurality of common pulse signal sections, a value of each standard voltage section depending upon a corresponding duty ratio.

4. The multi-beam scanning apparatus of claim 1, wherein said standard voltage setter further comprises:
    a plurality of detecting circuits that are respectively connected to a corresponding laser driver, and that detect a corresponding common pulse signal section, and that respectively output a detecting signal; and
    a plurality of sample-hold circuits that are respectively connected to a corresponding laser driver and said standard voltage converter, that sample and hold a corresponding standard voltage section in accordance with an output timing of the detecting signal.

5. The multi-beam scanning apparatus of claim 1, wherein the standard signal includes at least one of a bias standard voltage for setting a bias current to each of said plurality of semiconductor lasers and an APC (Auto-Power Control) standard voltage for controlling the light-intensity of each of said plurality of semiconductor lasers.

6. The multi-beam scanning apparatus of claim 1, wherein said plurality of semiconductor lasers correspond to a plurality of colors used in a color-image.

7. The multi-beam scanning apparatus of claim 1, further comprising:
   a sensor that detects a surface voltage on a photosensitive body; and
   an image controller that adjusts the sequence of pulse signals such that a value of a corresponding standard voltage section is modified in accordance with the surface voltage.

8. A scanning unit of a multi-beam scanning apparatus comprising:
   a plurality of semiconductor lasers that emit laser beams;
   a scanner that has an optical system and scans the laser beam emitted from said plurality of semiconductor lasers;
   a plurality of laser drivers that respectively drive a corresponding semiconductor laser among said plurality of semiconductor lasers in accordance with a standard signal and image data fed from a controller that is connected to said scanning unit, a sequence of pulse signals having a plurality of common pulse signal sections that correspond to said plurality of semiconductor lasers, each of said plurality of common pulse signal sections having a peculiar waveform characteristic depending upon a corresponding semiconductor laser;
   a standard voltage generator that converts the sequence of pulse signals to a sequence of standard voltage signals that correspond to said plurality of semiconductor lasers and have a plurality of standard voltage ranges; and
   a standard voltage setter that detects each of the plurality of common pulse signal sections in accordance with the characteristic, and transmits each value of the plurality of standard voltage ranges to a corresponding laser driver in accordance with a detected common pulse signal section, each of said plurality of laser drivers controlling the corresponding semiconductor laser in accordance with a value of a corresponding standard voltage range.

9. A controller of a multi-beam scanning apparatus, which is connected to the scanning unit in claim 8, said controller comprising:
   a standard signal generator that generates and outputs a sequence of pulse signals, the sequence of pulse signals having a plurality of common pulse signal sections that correspond to said plurality of semiconductor lasers, each of said plurality of common pulse signal sections having a peculiar waveform characteristic depending upon a corresponding semiconductor laser, and
   an image memory that stores image data associated with a color image and outputs the image data to said scanning unit.

* * * * *